(12) United States Patent
Qiao

(10) Patent No.: US 6,305,892 B1
(45) Date of Patent: Oct. 23, 2001

(54) FASTENING SYSTEM FOR SPEAKER GRILLES

(75) Inventor: Huili Qiao, Darien, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 255 days.

(21) Appl. No.: 08/909,834

(22) Filed: Aug. 12, 1997

(51) Int. Cl.[7] .................................................... F16B 19/00
(52) U.S. Cl. ............................................ 411/508; 411/510
(58) Field of Search .......................... 411/508–510, 913; 381/188, 205; 181/199

(56) References Cited

U.S. PATENT DOCUMENTS

| | | | |
|---|---|---|---|
| D. 293,880 | * | 1/1988 | Takahashi ............................ 411/508 |
| 3,252,677 | * | 5/1966 | Raymond .............................. 411/510 |
| 3,651,545 | * | 3/1972 | Hara ..................................... 411/508 |
| 4,331,841 | * | 5/1982 | Castagna .............................. 181/199 |
| 4,422,222 | * | 12/1983 | Notoya ................................. 411/508 |
| 4,524,494 | * | 6/1985 | Sato ..................................... 411/913 |
| 4,681,288 | * | 7/1987 | Nakamura ............................ 411/508 |
| 4,993,511 | * | 2/1991 | Hiraki .................................. 181/188 |

\* cited by examiner

Primary Examiner—Flemming Saether

(57) ABSTRACT

A fastener for removably attaching a speaker grill to a cabinet includes a head having a pair of outwardly directed wings that have inwardly directed ramps at their bottoms to aid in disengaging the speaker grille receptacle from the fastener. A pair of angled abutments beneath the head are arranged to sandwich the receptacle between the abutments and the ramps to provide a secure, yet readily removable, grill. The tree-like base of the fastener includes a plurality of resilient branches for frictionally engaging the inner surface of an aperture in a wood or wood composition cabinet. The end of the base includes a pair of resilient wings that expand to engage the bottom of an aperture in a plastic cabinet.

14 Claims, 2 Drawing Sheets

FASTENING SYSTEM FOR SPEAKER GRILLES

BACKGROUND OF THE INVENTION AND PRIOR ART

This invention relates generally to fastening systems and specifically to a system for removably securing a speaker grille to a cabinet.

The prior art method of choice for fastening large push-on, pull-off speaker grilles to cabinets, in rear projection television receivers for example, employs rubber grommets in the cabinet and cylindrical members (with barbs around them) on the speaker grille that matingly engage the rubber grommets. The system is not only expensive, but requires that relatively close tolerances be maintained between the apertures (rubber grommets) in the cabinet and the male mating members on the grille. Typically, the rubber grommets are inserted into holes in the television cabinet. The frictional engagement between the grommets and the smooth cylindrical members of the speaker grille is often inadequate to maintain the grille in position, when subjected to vibration. The arrangement also imposes tighter tolerances on the parts. In an effort to resolve this problem, barbs are added to the smooth cylindrical members and to the grommets. Besides the added cost of tooling, this solution to the problem of the grilles falling off leads to another problem. Specifically, because of the barbed design, the rubber grommets themselves are easily pulled off of the cabinet when the grille is removed. The benefit of the prior art system is that a relatively immobile connection of the speaker grille and cabinet results, which is very important for an audio system. As will be seen, the present invention achieves the same results as the prior art in a more simple, cost effective manner.

OBJECTS OF THE INVENTION

A principal object of the invention is to provide a novel speaker grille fastening system and method.

Another object of the invention is to provide an improved low cost system for fastening a speaker grille to a cabinet.

A further object of the invention is to provide an improved speaker grille mounting system.

An advantage of the invention resides in the provision of a novel fastener element that facilitates the removable engagement of a speaker grille and a cabinet.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

As mentioned, the popular prior art method of mounting large speaker grilles to rear projection television receivers involves using a plurality of rubber grommets, secured in suitable apertures of the cabinet, to frictionally engage mating male members on the speaker grille. The system performs adequately, but is relatively expensive and requires fairly close control of tolerances between the aperture positions and the male members of the speaker grille. While not to be restricted, the invention is primarily concerned with removably securing relatively large, rigid grille structures to cabinets (of wood or wood composition and plastic), generally cabinets that house rear projection television receivers. It will be appreciated that the rigid speaker grilles in such installations are molded of a plastic material that has substantial rigidity and which consequently is prone to vibration if not rigidly secured. In an audio system of some range and power, a loosely mounted speaker grille is totally unacceptable. As will be seen, the invention enables a rigid mounting of the speaker grille (for vibration-free performance) in a simple, low cost mounting system.

Figure 1:
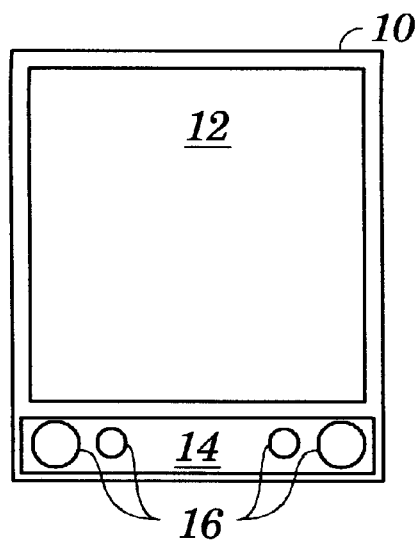
FIG. 1 illustrates a conventional rear projection type television receiver having a large speaker grille.

FIG. 1 depicts a conventional rear projection television receiver 10 having a picture tube 12 and a fairly large generally rectangular speaker grille 14 that provides a decorative, sound transparent front for a plurality of loudspeakers 16, illustrated in dotted lines. It will be appreciated that the illustration is not to be considered restrictive of the scope of the invention.

Figure 2:
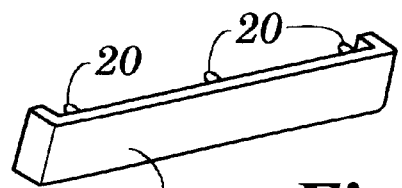
FIG. 2 is a perspective view indicating the general construction of the speaker grille of FIG. 1.
Figure 3:
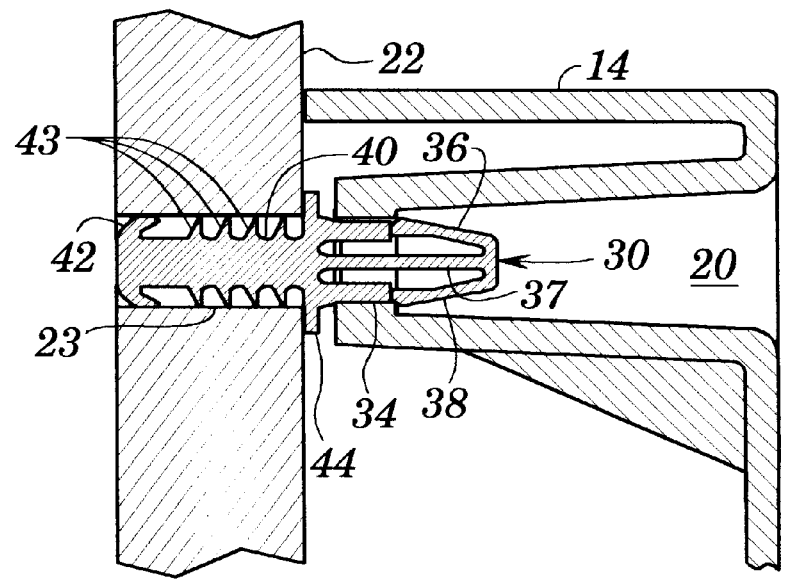
FIG. 3 is a partial cross sectional view showing a fastener of the invention securing a speaker grille to a wood or composition wood cabinet.

In FIG. 2, the general configuration of speaker grille 14 is shown, and in particular, mounting bosses 20 are illustrated. The speaker grille is preferably made of molded plastic with bosses 20 being formed therein at various locations. As best seen in the cross section through a boss 20 in FIG. 3, speaker grille 14 abuts against the wall of a cabinet 22 and is secured thereto by means of a fastener 30 that is affixed to cabinet 22. Specifically, fastener 30 includes a head having a pair of outwardly directed resilient wings 36 and 38 that emanate from a central member 37 which extends from a tree-like base 40. The base 40 includes a plurality of resilient branches 43 that frictionally engage the walls of an aperture 23 in cabinet 22. A flange 44 between the head and the base of fastener 30 abuts the surface of cabinet 22, and in conjunction with base 40, provides a very rigid mount for the fastener. The fastener of FIG. 3 is preferably used with a cabinet 22 that is made of wood or a wood composition which enables the resilient branches 43 to "grip" the walls of aperture 23.

Figure 4:
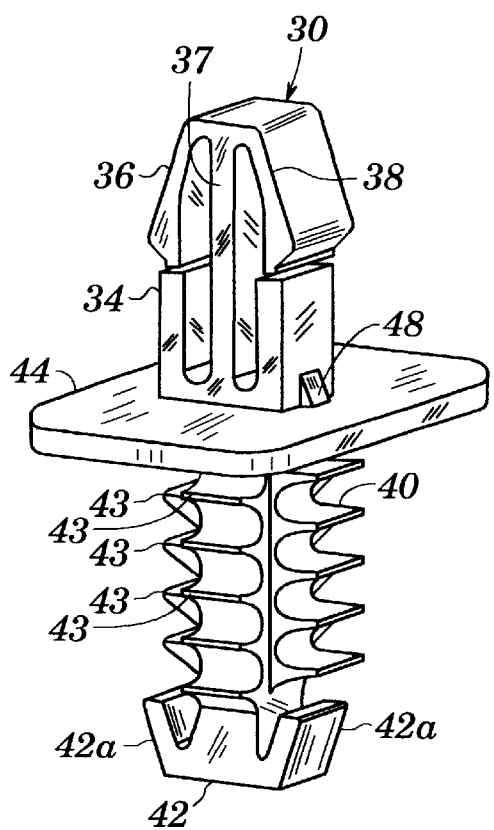
FIG. 4 is an enlarged perspective of a fastener constructed in accordance with the invention.
Figure 5:
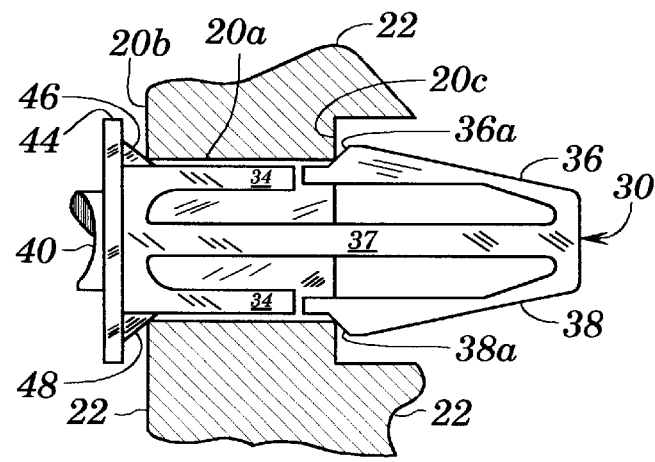
FIG. 5 is an enlarged partial cross section illustrating the arrangement of the fastener of the invention.

As best seen in FIGS. 4 and 5, the wings 36 and 38 on the head of fastener 30 have inwardly directed ramps 36a and 38a formed at their lower extremities, respectively. The receptacle in cabinet 22 comprises a shaped aperture 23 that is dimensioned such that the branches 43 of the tree-like base of fastener 30 deform when the fastener base is inserted to securely affix the fastener to cabinet 22. As mentioned, flange 44 assures a very rigid mounting for the fastener. Fastener 30 includes a pair of upstanding sidewalls 34 that extend from flange 44 and terminate just short of the lower portions of wings 36 and 38. The aperture in the bottom of boss 20 is defined by an inner wall 20a, a lower surface 20b having a tapered edge and an upper surface 20c, also having a tapered edge. The distance between the tapered edges on lower surface 20b and upper surface 20c is selected to result in the bottom of the boss being sandwiched between angled abutments 46 and 48 and ramps 36a and 38a, respectively, when the fastener 30 engages the boss 20. The upstanding sidewalls 34 are also securely gripped by the inner surface 20a of the boss and helps support the weight of the speaker grille. The construction thus assures a snug, vibration-free fit between the boss and the fastener.

The ramps 36a and 38a and the tapered edge of upper surface 20c enable the grille to be removed from the cabinet by the application of a greater force than the force required to engage the grille and the fastener. This removability feature is important since the speakers in the cabinet may occasionally need to be accessed. The angled abutments 46 and 48 on the fastener not only assure a close fit between the grille and the fastener, but provide a degree of tolerance in fit. Another important aspect of the fastener is the provision of ledges 35 at the base of ramps 36*a* and 38*a*. These ledges assure that the upper surface 20*c* of boss 20 will not slip under wings 36 and 38 as the speaker grille is being removed, which would tend to damage the fastener. With the inventive construction, the speaker grille may be removed without the danger of damaging the fasteners.

It will be appreciated that the construction need not be confined to the rectangular arrangement illustrated. A generally circular arrangement of the flared wings is also contemplated although such a construction requires more accurate positioning between the grille bosses and the fasteners. The bottom of the base 40 includes a portion having resilient wings 42*a* for use in plastic cabinets as opposed to the wood cabinet illustrated.

Figure 6:
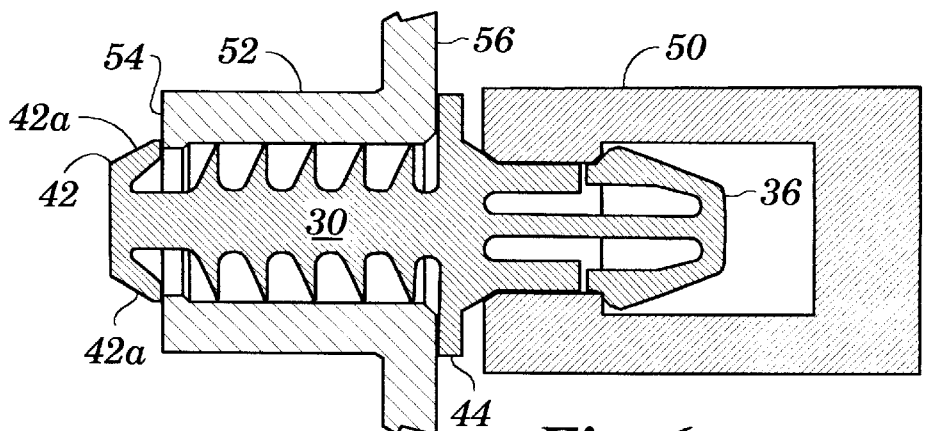
FIG. 6 is a view similar to FIG. 3 where the speaker grille engages a plastic panel.

This arrangement is shown in FIG. 6, where resilient wings 42*a* have expanded to engage the bottom 54 of a mounting hole 52 in a plastic panel 56. In this use, the distance between the flange 44 and resilient wings 42*a* must be slightly greater than the depth of mounting hole 52.

The fastener is molded of plastic material, and in the preferred embodiment, the receptacle is molded into the bottom of the bosses. A separate receptacle construction is also envisioned and the invention should not be considered to be limited to the exact configuration shown.

What has been described is a novel fastener and method for removably mounting a speaker grille to a cabinet. It is recognized that numerous variations in the described embodiment of the invention will occur to those skilled in the art without departing from its true spirit and scope. The invention is to be limited only as defined in the claims.

What is claimed is:

1. A method of removably securing a push-on, pull-off decorative speaker grille to a cabinet comprising:

forming a plurality of receptacles in the grille;

providing a corresponding plurality of fasteners, each having a head with outwardly flared resilient wings for engagement with a corresponding receptacle and a tree-like base for securely engaging a corresponding suitable aperture in the cabinet; and dimensioning the heads of the fasteners and the receptacles such that a first pushing force is required for engagement and a second, larger pulling force is required for disengagement.

2. The method of claim 1, including forming a ramp on the end of each resilient wing for aiding disengagement.

3. The method of claim 2, including forming angled abutments between the heads and the bases of the fasteners for urging the receptacles into snug engagement with the fasteners.

4. The method of claim 3, further including sizing the body of each fastener between its head and its base to provide a snug fit with the inside of the receptacle for enabling the fastener to support the weight of the speaker grille without vibration.

5. The method of claim 4, further including forming ledges at the ends of the ramps for confining outward movement of the resilient wings during removal of the speaker grille.

6. The method of claim 5, further including forming another pair of resilient wings at the bottom of the base of each fastener for engagement with the bottom surface of corresponding apertures in a plastic cabinet.

7. A method of removably securing a push-on, pull-off decorative speaker grille to a cabinet comprising:

forming a plurality of receptacles in the grille;

providing a corresponding plurality of fasteners, each having a head with outwardly flared resilient wings for engagement with a receptacle and a tree-like base for securely engaging a suitable corresponding aperture in the cabinet;

forming a ramp on the end of each resilient wing for aiding disengagement;

forming abutments between the heads and the bases of the fasteners for urging the receptacles into snug engagement with the fasteners; and dimensioning the heads of the fasteners and the receptacles such that a first pushing force is required for engagement and a second, larger pulling force is required for disengagement.

8. A removable fastening system for a push-on, pull-off speaker grille and a cabinet including a plurality of apertures comprising:

a plurality of receptacles in said grille;

a plurality of fasteners, each having a head with outwardly flared resilient wings for engagement with corresponding ones of said receptacles and a tree-like base for securely engaging corresponding ones of said apertures in said cabinet; and said head of each said fastener and each said receptacle being dimensioned such that a first pushing force is required for engagement and a second, larger pulling force is required for disengagement.

9. The system of claim 8, further including a ramp on the end of each said resilient wing for aiding in said disengagement.

10. The system of claim 9, further including abutments between said head and said base of each said fastener for urging said receptacles into snug engagement with said fasteners.

11. The system of claim 10, wherein the size of each said fastener between said head and said base provides a tight fit with the inside of its corresponding receptacle whereby said fasteners support the weight of said speaker grille without vibration.

12. The system of claim 11, further comprising:

ledges at the ends of said ramps, said ledges confining outward movement of said resilient wings during removal of said speaker grille.

13. The system of claim 12, wherein said cabinet is plastic and further comprising another pair of resilient wings at the bottom of said base of each said fastener for engagement with the bottom surface of its corresponding aperture.

14. A removable fastening system for a push-on, pull-off speaker grille and a cabinet having a plurality of apertures comprising:

a plurality of receptacles in said grille;

a plurality of fasteners, each having a head with outwardly flared resilient wings for engagement with corresponding ones of said receptacles and a tree-like base for securely engaging corresponding ones of said apertures in said cabinet;

a ramp on the end of each said resilient wing for aiding in disengagement of said fasteners and said grille;

abutments between said head and said base of each said fastener for urging said receptacles into engagement with said fasteners; and each said fastener and each said receptacle being dimensioned such that a first pushing force is required for engagement and a second, larger pulling force is required for disengagement.

* * * * *